(12) United States Patent
Peevey

(10) Patent No.: US 6,293,224 B1
(45) Date of Patent: Sep. 25, 2001

(54) SUPPLEMENTAL FEED BLOCK HOLDER

(76) Inventor: Monica A. Peevey, 1244 Seventh St., Norco, CA (US) 91760

( * ) Notice: Subject to any disclaimer, the term of this patent is extended or adjusted under 35 U.S.C. 154(b) by 0 days.

(21) Appl. No.: 09/366,141

(22) Filed: Aug. 3, 1999

Related U.S. Application Data

(60) Provisional application No. 60/095,100, filed on Aug. 3, 1998.

(51) Int. Cl.[7] ....................................... A01K 5/00
(52) U.S. Cl. ......................................... 119/51.03
(58) Field of Search ............................. 119/51.03, 57.8; 242/598.5

(56) References Cited

U.S. PATENT DOCUMENTS

| | | | |
|---|---|---|---|
| 321,582 | * | 7/1885 | Cox . |
| D. 336,582 | * | 6/1993 | Harrison ............................ D6/522 |
| D. 419,015 | * | 1/2000 | Umemoto ............................ D6/522 |
| 1,751,388 | * | 3/1930 | Bircher . |
| 1,897,969 | * | 2/1933 | Graham . |
| 2,139,910 | | 12/1938 | Patten . |
| 2,203,275 | | 6/1940 | Beyea . |
| 2,267,062 | | 12/1941 | Walter et al. . |
| 2,392,532 | * | 1/1946 | Hyde . |
| 2,661,719 | | 12/1953 | Scheidt et al. . |
| 2,833,247 | | 5/1958 | Beyea . |
| 2,908,250 | | 10/1959 | Aniser . |
| 3,140,692 | * | 7/1964 | Beyea . |
| 3,500,795 | * | 3/1970 | Towlerton . |
| 4,632,062 | * | 12/1986 | Hubbard ............................ 119/51.03 |
| 4,848,690 | * | 7/1989 | Lemoine ............................ 242/422.5 |
| 5,222,678 | * | 6/1993 | Carrington ........................ 242/598.2 |
| 5,755,178 | * | 5/1998 | Lush ................................. 119/51.03 |
| 6,085,692 | * | 7/2000 | Adams ............................... 119/51.03 |

* cited by examiner

Primary Examiner—Charles T. Jordan
Assistant Examiner—Yvonne R. Abbott
(74) Attorney, Agent, or Firm—Knobbe, Martens, Olson & Bear, LLP

(57) ABSTRACT

A feed block holder having a generally U-shape configuration with a first mounting post adapted to be secured to a vertical fence post at a least two locations along the length of the mounting post, and a feed block support post that is adapted to receive a supplemental feed block with a base member interconnecting the mounting post and the feed block support post. The mounting post and the feed block support post preferably extend in the same direction such that the plurality of securing points on the mounting post counteracts the tendency of the holder to pivot in response to loading of a supplemental feed block such as a salt block on the feed block holder. The feed block support post is configured to have a inner larger diameter section and a outer smaller diameter section such that lateral stability of the feed block can be provided as a result of the engagement of the larger diameter section of the support post engaging with the inner walls of a cavity formed in the supplemental feed block.

17 Claims, 4 Drawing Sheets

SUPPLEMENTAL FEED BLOCK HOLDER

RELATED APPLICATION

This application claims the benefit of U.S. provisional application Ser. No. 60/095,100 filed Aug. 3, 1998.

BACKGROUND OF THE INVENTION

1. Field of the Invention

The present invention relates to an apparatus for feeding livestock and, in particular, concerns an apparatus for mounting a salt or mineral block to a corral or fence post such that the salt or mineral block is elevated off the ground.

2. Description of the Related Art

It is well known that livestock often requires the addition of mineral supplements or salts to their everyday diet. Livestock are typically fed either by allowing the livestock to graze upon natural grasses or are fed hay or feed in a corral. The hay or feed can be comprised of alfalfa hay or any of a number of different types of feed grains. In addition to these feeds, most livestock, such as horses and cattle, require the addition of salt and various other minerals to be added to their diet for the livestock to maintain adequate health.

To address this dietary need, livestock owners typically provide supplemental blocks of feed salt minerals, or mineral laden salt to their animals. Often times, the livestock owner simply deposits the supplemental feed block on the ground at a location where the livestock can consume the supplemental feed block. Typically, a very large supplemental feed block can weigh upwards up to 50 pounds and can provide the necessary supplemental nutrition to the livestock for an extended period of time.

However, one difficulty of leaving the supplemental feed block on the ground is that it promotes waste of the feed block. In particular, if the supplemental feed block is positioned in the ground of a livestock corral, such as a horse corral, the feed block may be contaminated by dirt and manure to the point where the livestock will no longer consume the feed block. Similarly, the feed block may be damaged as a result of the livestock inadvertently stepping on the feed block. Moreover, by positioning the feed block on the ground, the feed block may also be dissolved if it is left to rest in water occurring as a result of rain or sprinkling.

Hence, it is often desirable to mount a supplemental feed block in a location where the feed block is not positioned on the ground. To address this need, some salt or feed block holders have been developed. In particular, U.S. Pat. No. 2,203,275 to Beyea disclose one typical prior art supplemental feed block holder. The salt block holder illustrated on the Beyea patent includes a platform that has a recess which is adapted to receive a generally cylindrical salt block and then an arm with a single clamp that is adapted to clamp on to a vertical post of a corral. While the apparatus disclosed in the Beyea patent allows for the mounting of supplemental feed blocks off of the ground, this particular block holder is limited in its capability and is expensive to manufacture.

In particular, the Beyea salt block holder has a receptacle in which a particular size of salt block is to be mounted. Salt blocks that do not have that configuration cannot be mounted in this particular receptacle. Moreover, the use of a receptacle necessitates that the receptacle be equipped with a drain as water and saliva would otherwise collect in the receptacle and begin to dissolve the salt block.

Moreover, the Beyea salt block holder is adapted to be used primarily with smaller salt blocks. The use of only a single clamp that clamps directly onto a vertical post of a corral or enclosure limits the total weight of the salt or supplemental feed block that can be supported by the holder over long periods of time. Larger supplemental feed blocks will result in a tremendous force being placed upon the single clamp as a result of the cantilevered loading. This can resolve in the clamp bending over time, damaging the fence post or loosening the holder from the vertical post.

Hence, it will appreciated that there is a continuing need for a salt or supplemental feed block holder that can be attached to corral post or fence post so as to maintain the supplemental feed block in an elevated position above the ground. To this end, there is a need for a supplemental feed block holder that can be used in conjunction with the number of different supplemental feed blocks having different configurations and is also adapted for supporting heavier supplemental feed blocks including feed blocks having weights in excess of approximately 50 pounds.

SUMMARY OF THE INVENTION

The aforementioned needs are satisfied by the feed block holder of the present invention which, in one aspect, is comprised of a U-shape member defining a supplemental feed block post, a mounting post and an arm interconnecting the supplemental feed block post and the mounting post. The mounting post is adapted to be attached to a vertical post of a fence or corral at approximately a first end and approximately a second end of the mounting post to thereby distribute the force exerted upon the interconnection between the supplemental feed block apparatus and the corral or fence post.

In one embodiment, the supplemental feed block post is comprised of a single post that is adapted to be positioned within a cavity formed in supplemental feed blocks so as to retain the supplemental feed block thereon. In one particular embodiment, the supplemental feed block post has a first section of a first cross-sectional area and a second section of a second, smaller cross-sectional. Preferably, the larger first section of the post engages with the interior walls of the cavities formed in the feed blocks to securely retain the feed block thereon. The use of a smaller second section of the supplemental feed block post allows for feed blocks having openings of different sizes to be mounted on the post holder. In one embodiment, the U-shape member is attached to a vertical post of a fence or corral through the use of two panel clamps.

It will be appreciated that the U-shape configuration of the supplemental feed block mounting apparatus allows for more secure mounting of the apparatus to a vertical post such that larger feed blocks can be mounted on the apparatus. Moreover, the use of a mounting post as oppose to a tray reduces the problems associated with the accumulation of water about the supplemental feed block which can result in the supplemental feed block being damaged or dissolved. These and other objects and advantages of the present invention will become more fully apparent from the following description taken in conjunction with the accompanying drawings.

DETAILED DESCRIPTION OF THE PREFERRED EMBODIMENT

Figure 1:
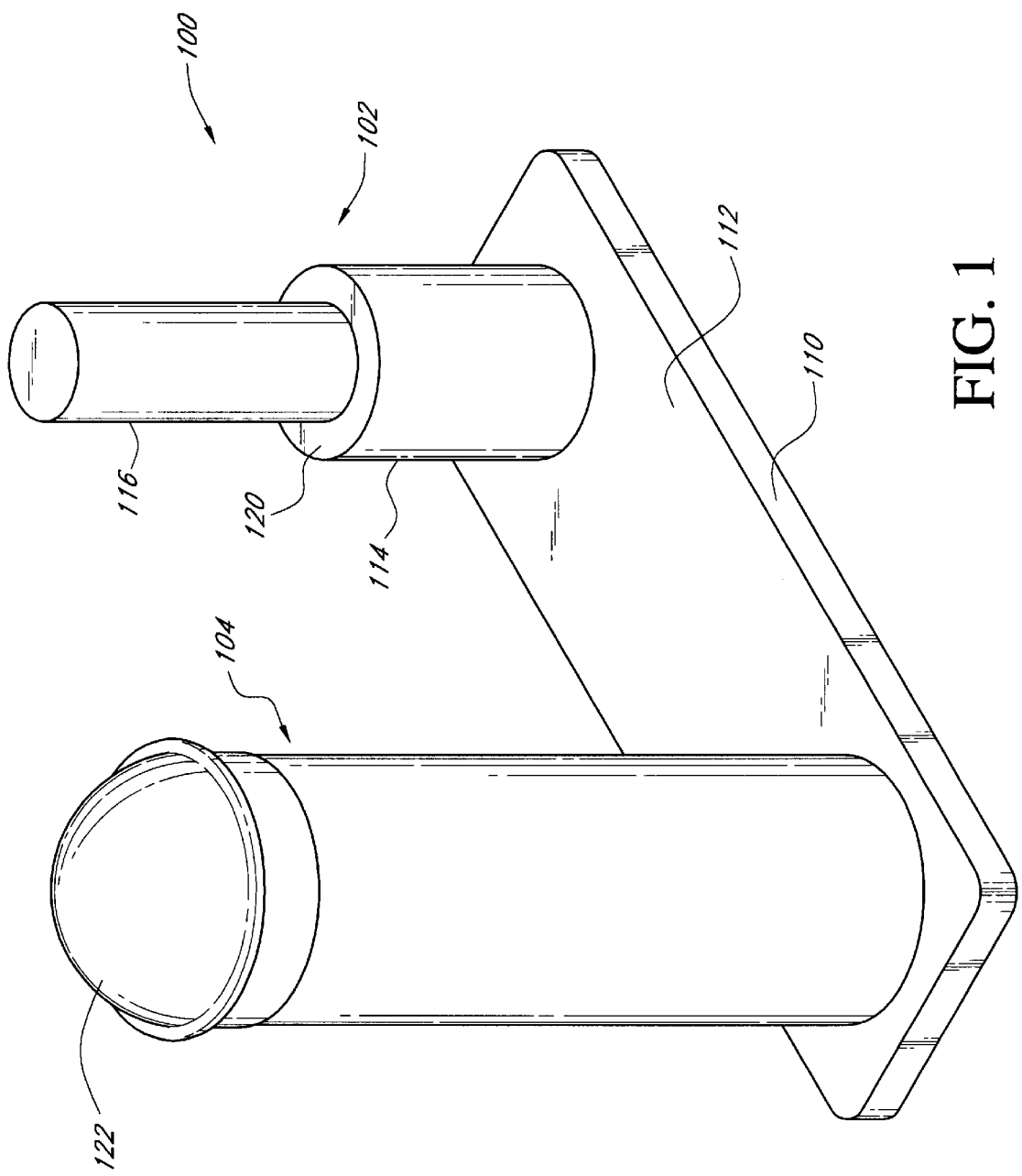
FIG. 1 is a perspective view of a supplemental feed block of the preferred embodiment.

Reference will now be made to the drawings wherein like numerals preferred to like parts throughout. FIG. 1 illustrates one embodiment of a supplemental feed block holder 100. As illustrated on this embodiment, the supplemental feed block holder 100 is generally U-shape having a feed block post 102 that is adapted to receive a supplemental feed block 160 in a manner that will be described in greater detail below and a mounting post 104 that is adapted to be attached to a vertical post of a fence or corral. Both the supplemental feed block post 102 and the mounting post 104 extend outwardly in the same direction from a first side 112 of a base member 110 that interconnects the supplemental feed block post 102 and the mounting post 104. As illustrated in FIG. 1, in this embodiment, the feed block post 102 is generally cylindrical in shape and has a first section 114 of a first diameter in a second section 116 of a second diameter that is less than the first diameter. The first section 114 is mounted on the upper face 112 of the face member 110 and the second section 116 is positioned on an outer face 120 of the first section 114 of the feed block post 102. As is illustrated in FIG. 1 the outer end 122 of the mounting post 104 is preferably capped with a cap 122 that has a generally rounded configuration so as to reduce the risk of injury to livestock who rub up against the feed block holder 100.

The supplemental feed block 100 is preferably adapted to allow for the mounting of particularly heavy supplemental feed blocks including salt blocks or blocks impregnated with supplemental minerals and nutrients that are to be consumed by livestock, such as horses and cattle. In one particular embodiment, the mounting post 104 is comprised of a 2 inch diameter aluminum tube with ½ inch thick walls that is approximately 6 inches in length and it is attached to the base member 110 which is comprised of a flat piece of aluminum which measures ⅜ of an inch thick by 2 and ½ inches wide by 8 inches long. The mounting post 104 is attached, preferably through well known welding techniques so as to be a ¼ of an inch from the end of the base member 110 and so as to be centered on the base member approximately ¼ of an inch from either side of the base member. The feed block support post 102 is also comprised of an aluminum tube or bar that is positioned ½ an inch from the end and centered on the base member 110 so as to be ½ of an inch from the sides of the base member. The first section 114 of the feed block post 102 is, in this embodiment, is 1½ inches in diameter and has a length of approximately 2 and ¼ inches. The second section 116 of the feed block post 102 has 1 inch in diameter and is 3 and ¼ inches long such that the feed block post 102 is approximately 5 and ½ inches long. The outer surface of the second section 116 of these feed block post 102 can be configured so as to be adapted to receive supplemental feed blocks having openings of different configurations. For example, in one embodiment, the feed block post 102 can have a tapered shape so as to better support feed block having conical shaped openings. It will be appreciated that the dimensions listed herein are simply exemplary dimensions of one particular embodiment of the invention and should not be taken as limitation on the overall size of the feed block hold as the feed block holder 100 can be adapted to support feed blocks of any of a number of different sizes and shapes without departing from the spirit of the present invention.

Figure 2:
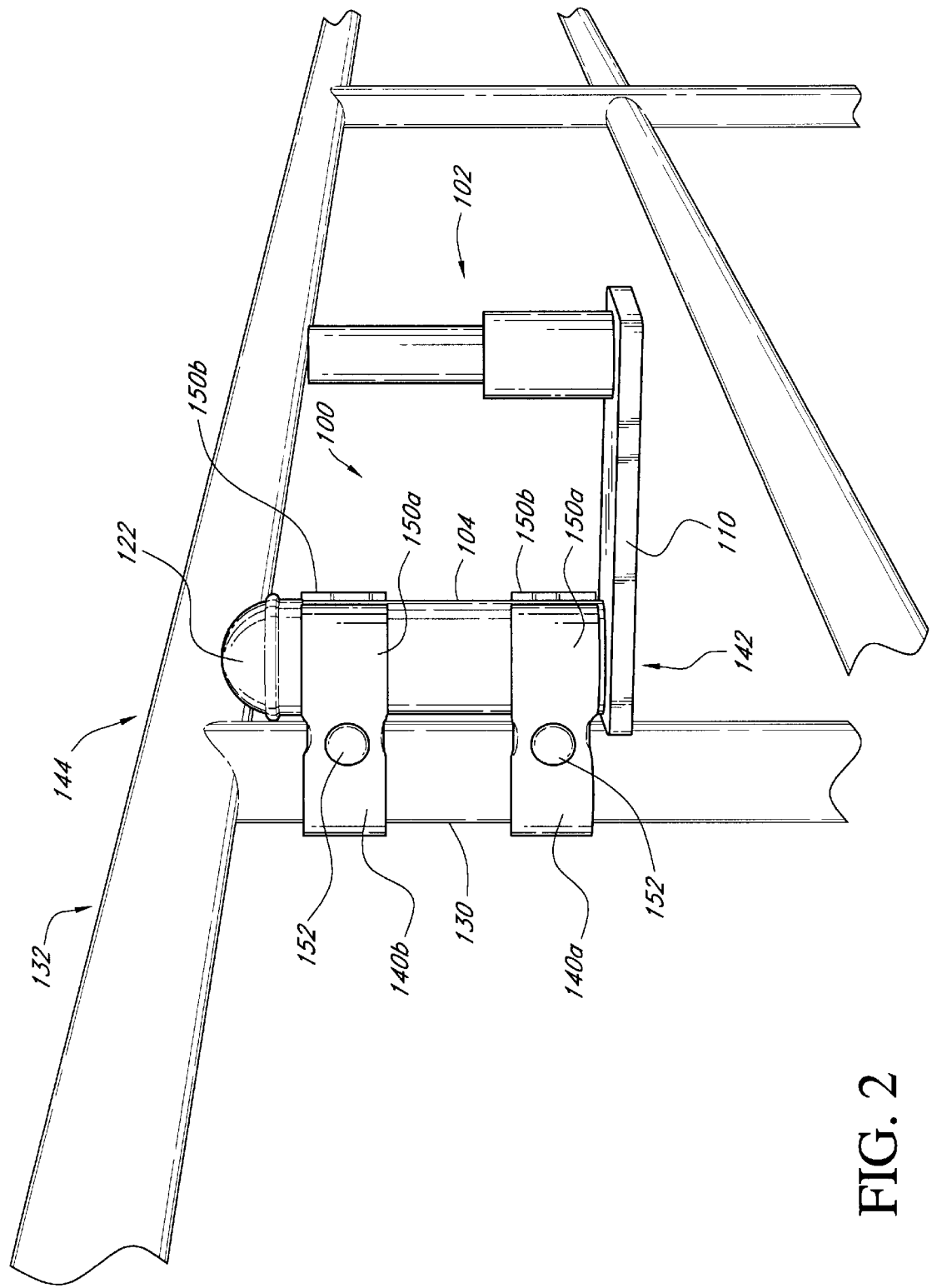
FIG. 2 is a perspective view illustrating the attachment of the supplemental feed block of FIG. 1 to a vertical post of a corral.

Referring now to FIG. 2, the manner in which the feed block holder 100 is attached to a vertical post 130 of a fence 132 is illustrated. In particular, the use of the elongate mounting post 104 allows for the attachment of the feed block holder 100 at two different vertical locations through the use of securing devices 140 such as clamps or straps. In particular, as illustrated in FIG. 2, the mounted post 104 is attached to the vertical post 130 at a bottom end 142 of the mounting post 104 with a first securing device 140a which, in this embodiment, is comprised of a clamp that is adapted to fit about both the mounting post 104 and a circular pipe comprising the vertical post 130 such as the types of pipes that are commonly used in horse pipe corral structures. Similarly, a second securing device 140b is attached to the upper end 144 of the mounting post at approximately the same height above the base member 110 as the top of the feed block post 102 using a securing device 140b such as a clamp.

In this embodiment, the securing devices 140a, 140b are comprised of clamps that have a first member 150a and a second member 150b each of which define generally circular recesses that are adapted to receive the generally circular mounting post 104 and the generally circular fence post 130. The clamp members 150a, 150b are interconnected with a nut and bolt assembly 152 that attaches the clamp members 150a, 150b together at the middle of the clamp members 150a, 150b, such that tightening of the nut and bolt assembly 152 squeezes the mounting post 104 and the fence post 130 between the recesses define by the clamp members 150a, 150b such that the mounting post 104 is secured to the vertical post 130. These types of clamps are well known in the art and, it will be appreciated, that there are simply exemplary of one preferred type of device for securing the feed block holder 100 to the fence 132 and that any of a number of different securing devices can be used without departing from the spirit of the present invention.

Figure 3A:
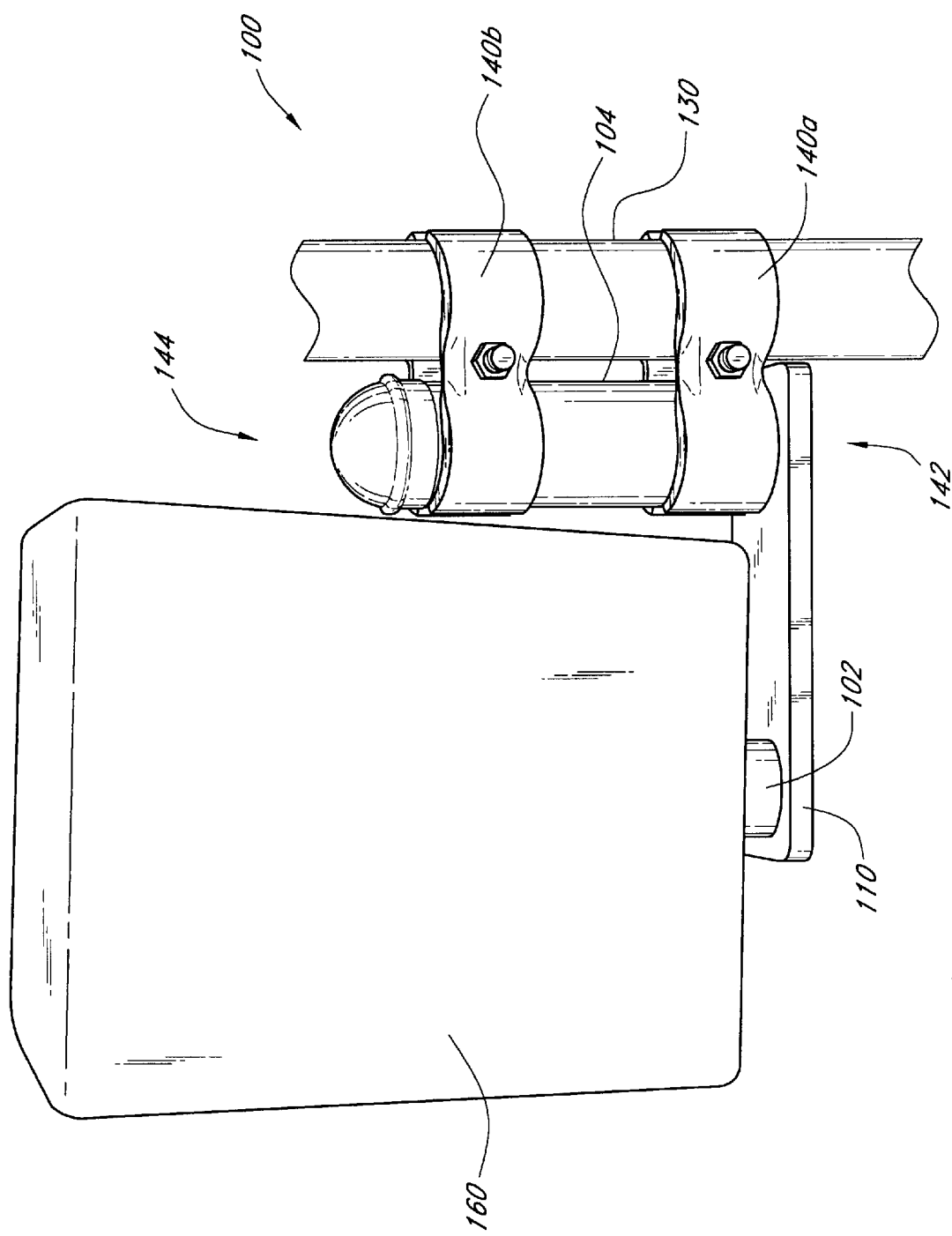
FIG. 3A is a side view illustration of the supplemental feed post mounting apparatus of FIG. 1 illustrating how a supplemental feed post is supported by the mounting apparatus of FIG. 1.

As is illustrated in FIG. 3A, a feed block 160 which, in this embodiment, is comprised of a salt block that is generally in a shape of a cube that is generally approximately 8 inches tall by 8 inches wide by 8 inches deep is mounted so as to be centered on the feed block mounting post 102. The feed block mounting post 102 extends into the approximate middle of the block 160 such that the block 160 is securely positioned on the feed block post 102. It will be appreciated that because the supplemental feed block 160 is relatively heavy, e.g. up to 50 pounds or more in weight, and is mounted so as to be cantilevered out from the fence post 130 by the base member 110, the tendency of the supplemental feed block holder 100 under the force of the supplemental feed block 160 is to rotate about a pivot point which occurs at approximately the interconnection between the bottom end 142 of the mounting post 104 where the securing device 140a attaches the feed block holder 100 to the fence post 130. However, the use of an upper securing device 140b that secures the top end 144 of the mounting post 104 to the fence post 130 effectively counter acts the tendency of the feed block holder 100 to pivot in response to the loading of the feed block holder 100 by the heavy supplemental feed block 160. In this way, the supplemental feed block holder 100 is able to be more securely attached to the fence post 130 such that is will stay rigidly attached to the vertical post 130 over longer periods of time without straining or breaking the securing devices 140a, 140b.

Figure 3B:
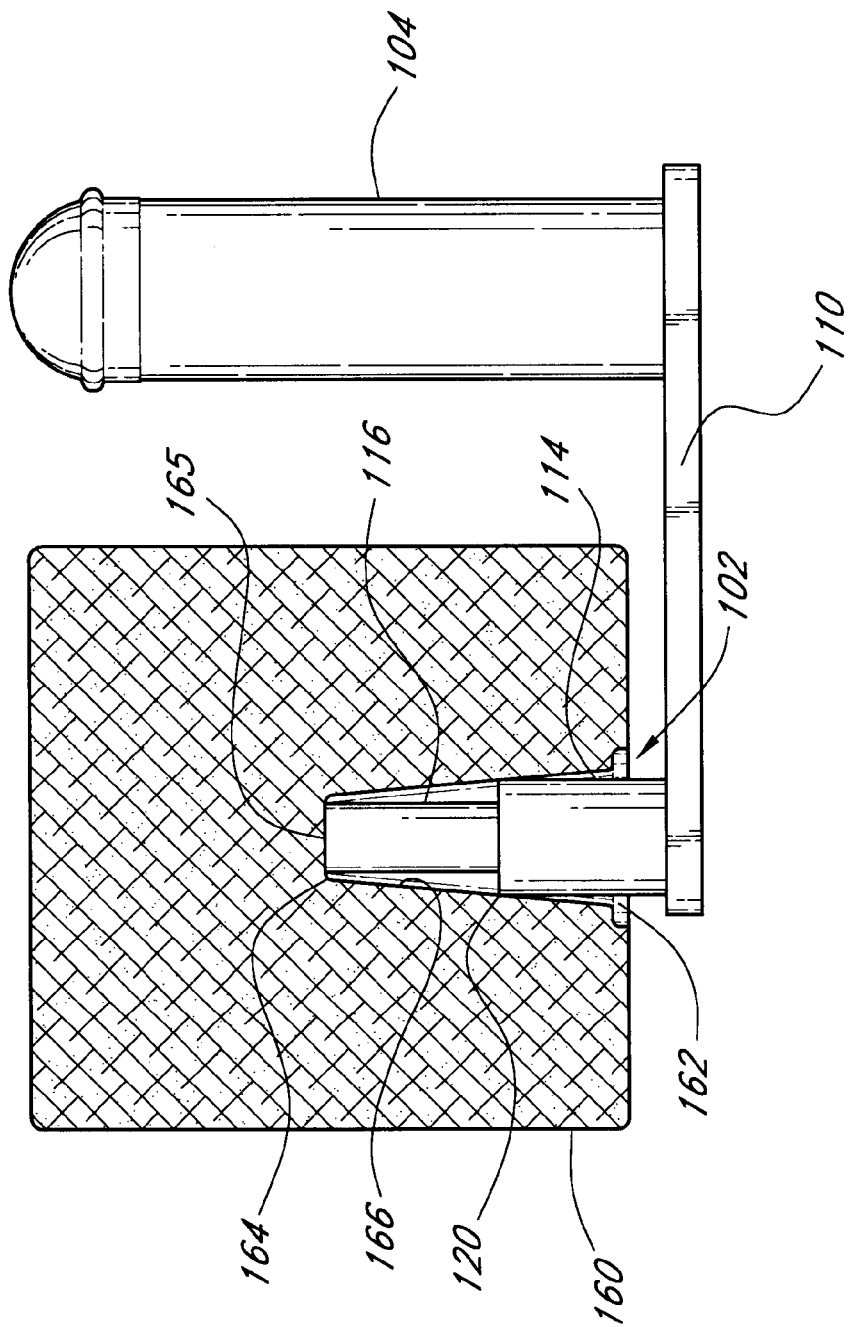
FIG. 3B is a cross-sectional cut-way view illustrating the manner in which a supplemental feed block is mounted on the supplemental feed block mounting apparatus of FIG. 1.

FIG. 3B further illustrates the manner in which a supplemental feed block 160, such as a salt block is mounted on the feed block post 102. In particular, most commonly sold salt blocks 160 have an aperture or cavity 162 that is generally tapered inward as illustrated in the cut way view of FIG. 3B. The second section 116 of the feed block post 102 is dimensioned so as to be able to extend to the apex 164 of the aperture 162 in the salt block 160. The outer surface 120 of the larger diameter first section 114 of the feed block post 102 gouges into the inter walls 166 of the aperture or cavity 162 so as to secure the salt block 160 on the feed block post 102. Moreover, the tip 165 of the second section 116 engages with the apex 164 so as to further laterally stabilize the feed block 160 on the holder. Hence, the outer perimeter of the first section 114 of the feed block post 102 and the tip 165 of the second section 116 has the effect of laterally stabilizing the salt block 160 on the feed block post 102. It will be appreciated that significant forces will be exerted upon the feed block 160 when livestock are eating the outer surfaces of the feed block 160. These significant forces can result in a feed block being dislodged from the feed block post 102, however, the use of larger diameter outer surfaces on the first section 114 of the feed block post 102 inhibits the dislodgment of the feed block 160 from the feed block post 102 as a result of livestock eating the feed block. Moreover, some feed blocks 160 have smaller diameter aperture 162 and the use of multiple sections on the feed block post 102 having different dimensions facilitates the mounting of feed blocks having different size apertures.

As is also illustrated in FIG. 3B, the feed block post 102 extends into the center of the supplemental feed block 160 about the same distance that the second end 144 of the mounting post 104 extends outward from the base member 110. By attaching the second end 144 of the mounting post 104 with a separate securing device 140b, the tendency of the holder 100 to pivot as a result of the weight of the block 160 is reduced due to the center of mass of the block 160 being supported at substantially the same height that the second end 144 of the mounting post 104 is attached to the fence post 130.

From the foregoing, it will be appreciated that the feed block holder 100 of the preferred embodiment is more securely mounted to a fence post, more securely retains a supplemental feed block such as a salt block and is more flexible in being able accommodate supplemental feed blocks of different sizes and manufactures. Moreover, as the feed block is essentially comprised of three components in this embodiment, the feed block post of the preferred embodiment is more inexpensively manufactured than the more complex feed block mounting structures of the prior art. Consequently, an inexpensive, stable feed block holder is now available for livestock owners to mount supplemental feed blocks in a position where they are elevated from the ground and are thus less prone to contamination and damage as a result of being positioned on the ground.

Although the foregoing description of the preferred embodiment of the present invention has shown, described and pointed out the fundamental novel features of the invention, it will be understood that various omissions, substitutions, and changes on the form of the detail of the apparatus as illustrated as well as the uses thereof, may be made by those skilled in the art without departing from the spirit of the present invention. Consequently, the scope of the present invention should not be limited to the foregoing discussions, but should be defined by the appended claims.

What is claimed is:

1. A supplemental feed block holder for supporting a supplemental feed block the holder comprising:
    a mounting post having a first and a second end wherein the mounting post is adapted to be attached to a vertical fence post in at least two locations on the mounting post;
    a feed block support post having a first and a second end wherein the feed block support post receives the supplemental feed block and retains the supplemental feed block thereon; a base member interconnecting the first end of the mounting post and the first end of the feed block support post wherein the feed block support post has a first section attached to the base member having a first cross-sectional area and a second section attached to the distal end of the first section having a second cross sectional area wherein the first section is dimensioned so as to engage with the inner walls of a supplemental feed block so as to laterally stabilize the feed block on the feed block holder;
    a first securing device that is adapted to secure the second end of the mounting post to the vertical fence post so as to inhibit the tendency of the feed block holder to pivot about the first end of the mounting post in response to positioning of a supplemental feed block on the feed block support post.

2. The holder of claim 1, wherein the first and second securing devices comprise clamps that clamp to the first and second ends of the mounting post and the vertical fence post.

3. The holder of claim 1, wherein the feed block support post extends outward from the base member approximately 5¼ inches with the first section being approximately 2¼ inches in length.

4. The holder of claim 3, wherein the mounting member extends outward from the base member approximately 6 inches.

5. The holder of claim 4, wherein the base member is approximately 8 inches long and the feed block support post and the mounting post are located at distal ends of the base member.

6. The holder of claim 1, wherein the feed block support post is sized so as to engage with the inner walls of a cone shaped hole formed on a supplemental feed block.

7. The holder of claim 1, wherein the first and second securing devices secure the holder to a vertical fence post so that the holder can retain a supplemental feel block weighing approximately 50 pounds suspended above the ground.

8. A supplemental feed block holder for mounting a supplemental feed block having a cavity formed therein on a vertical fence post, the feed block holder comprising:
    a mounting post having a first and a second end wherein the mounting post is adapted to be attached to a vertical fence post;
    a first securing device that attaches a first end of the mounting post to a vertical fence post and a second securing device that attaches a second end of the mounting post to a vertical fence post;
    a feed block support post having a first and a second end wherein the feed block support post is adapted to receive a supplemental feed block and retain the supplemental feed block thereon;
    a base member interconnecting the first end of the mounting post and the first end of the feed block support post wherein the mounting post extends outward from the base a distance substantially equal to the feed block support post and wherein the feed block support post is sized so as to be positioned in the cavity of the supplemental feed block so that the center of mass of the supplemental feed block is located at about the same distance from the base member as the second securing device.

9. The holder of claim 8, wherein the first and second securing device comprise clamps that clamp to the first and second ends of the mounting post and the vertical fence post.

10. The holder of claim 9, wherein the feed block support post has a first section attached to the base member having a first cross-sectional area and a second section attached to the distal end of the first section having a second cross sectional area wherein the first section is dimensioned so as to engage with the inner walls of a supplemental feed block so as to laterally stabilize the feed block on the feed block holder.

11. The holder of claim 10, wherein the feed block support post extends outward from the base member approximately 5¼ inches with the first section being approximately 2¼ inches in length.

12. The holder of claim 11, wherein the mounting member extends outward from the base member approximately 6 inches.

13. The holder of claim 12, wherein the base member is approximately 8 inches long and the feed block support post and the mounting post are located at distal ends of the base member.

14. A method of mounting supplemental feed block having a cavity formed therein, the method comprising:

attaching a U-shaped member to a vertical post, wherein the U-shaped member comprises a first arm, a base member, and a second arm;

attaching the first arm of the U-shaped member to the vertical post at a first location along the first arm adjacent an upper end of the first arm by means of a first securing device, and attaching the first arm to the vertical post at a second location along the first arm adjacent a lower end of the first arm by means of a second securing device; and positioning the supplemental feed block on the second arm of the U-shaped member so that the second arm of the U-shaped member is positioned in the cavity of the supplemental feed block so that a first section of the second arm of a first diameter engages with the inner wall of the supplemental feed block cavity so as to laterally stabilize the feed block on the feed block holder while a second section of second arm of a second diameter extends into the cavity wherein the first an of the U-shaped member is attached to the vertical post at the first and second locations along the first arm so that the first location is positioned at least as high as the center of mass of the feed block in such a manner that the tendency of the U-shaped member to pivot about a first end of the first arm as a result of the positioning of the supplemental feed block on the second arm is inhibited.

15. The method of claim 14, wherein attaching the first arm of the U-shaped member to the vertical post comprises attaching a first end and a second end of the first arm to the vertical post.

16. The method of claim 15, wherein positioning the supplemental feed block on the second arm of the U-shaped member comprises positioning the cavity on the second arm so that the first section of a first cross sectional area of the second arm engages with the inner walls of the cavity while the second section of a second cross sectional area, less than the first cross sectional area, extends further inward into the cavity so that the engagement of the first section and the inner walls of the cavity and engagement of the tip of the second section with the end of the cavity laterally stabilize the supplemental feed block.

17. The method of claim 16, wherein positioning the supplemental feed block on the second arm comprises positioning a supplemental feed block weighing approximately 50 pounds on the second arm.

* * * * *